US009386177B2

(12) United States Patent
Ishido

(10) Patent No.: US 9,386,177 B2
(45) Date of Patent: Jul. 5, 2016

(54) INFORMATION PROCESSING APPARATUS AND ORIGINAL READING APPARATUS

(71) Applicant: CANON KABUSHIKI KAISHA, Tokyo (JP)

(72) Inventor: Katsuhiro Ishido, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/674,981

(22) Filed: Mar. 31, 2015

(65) Prior Publication Data
US 2015/0296094 A1 Oct. 15, 2015

(30) Foreign Application Priority Data

Apr. 10, 2014 (JP) .................................. 2014-080753

(51) Int. Cl.
H04N 1/04 (2006.01)
H04N 1/00 (2006.01)

(52) U.S. Cl.
CPC ............. *H04N 1/00798* (2013.01); *H04N 1/04* (2013.01)

(58) Field of Classification Search
CPC ..... G06F 1/324; G06F 3/04817; G06F 13/36; G06F 1/3225; G06F 11/073; G06F 13/16; G06F 13/4243; H04N 19/436; H04N 19/00951; H04N 19/42; H04N 19/593; H04N 19/82; H04N 19/89; H04N 19/91
USPC ........................................ 358/1.13, 1.15, 474
See application file for complete search history.

(56) References Cited

U.S. PATENT DOCUMENTS

| 4,706,221 | A  | * | 11/1987 | Satoh et al. | .................... 365/222 |
| 5,954,436 | A  | * | 9/1999 | Kageyama et al. | ........... 400/188 |
| 6,704,434 | B1 | * | 3/2004 | Sakoh | ........................ B60R 1/00 340/933 |
| 6,816,618 | B1 | * | 11/2004 | Imaizumi et al. | ............. 382/239 |
| 7,113,208 | B1 | * | 9/2006 | Saga | ........................ 348/231.99 |
| 7,903,296 | B2 | * | 3/2011 | Ishido | ........................... 358/474 |
| 8,059,314 | B2 | * | 11/2011 | Ishido | ........................... 358/474 |
| 2005/0100358 | A1 | * | 5/2005 | Ushio et al. | ..................... 399/82 |
| 2005/0105930 | A1 | * | 5/2005 | Sakai et al. | ..................... 399/82 |
| 2005/0152711 | A1 | * | 7/2005 | Yokobori et al. | .............. 399/82 |
| 2005/0200915 | A1 | * | 9/2005 | Michiie et al. | ................ 358/471 |
| 2008/0068681 | A1 | * | 3/2008 | Ishido | ............... H04N 1/00933 358/498 |

(Continued)

FOREIGN PATENT DOCUMENTS

JP 9-223061 8/1997
JP 2005-236578 9/2005

*Primary Examiner* — Negussie Worku
(74) *Attorney, Agent, or Firm* — Fitzpatrick, Cella, Harper & Scinto

(57) ABSTRACT

In the original reading apparatus configured to store the image data in the image storing unit such as temporary storage memory, time required to complete the overwriting for erasure is reduced. The image data read by the image reading unit is stored in the image data storing unit and the stored image data is output. To hold data stored in the image data storing unit, refresh processing, which is to perform processing intermittently required to hold the data stored in the image data storing unit, is performed at a predetermined execution frequency. After the image data is output, frequency to execute the refresh processing is reduced as compared to a predetermined execution frequency to perform writing of the dummy data.

12 Claims, 9 Drawing Sheets

(56) References Cited

U.S. PATENT DOCUMENTS

2008/0080024 A1* 4/2008 Ishido ................ H04N 1/00572
358/498
2008/0259415 A1* 10/2008 Ishido ................ H04N 1/00602
358/498
2011/0271032 A1* 11/2011 Yamada et al. ............... 711/102
2012/0008180 A1* 1/2012 Ishido .................... H04N 1/401
358/509
2012/0257230 A1* 10/2012 Okayama ..................... 358/1.12
2013/0003148 A1* 1/2013 Kani ............................. 358/505

* cited by examiner

INFORMATION PROCESSING APPARATUS AND ORIGINAL READING APPARATUS

BACKGROUND OF THE INVENTION

1. Field of the Invention

The present disclosure relates to an information processing apparatus and an original reading apparatus.

2. Description of the Related Art

Conventionally, an information processing apparatus and an original reading apparatus comprising an image reading apparatus is well-known. Further, as the image reading apparatus used in the information processing apparatus such as a copying machine etc., the original reading apparatus and the like which performs the so-called "original flow reading" is known. Such an apparatus conveys an original onto a platen glass one by one with an original conveyance apparatus. The original is exposed to light by an exposure device fixed to its conveyance path to read the image of the original. Further, the original reading apparatus which performs "double-side simultaneous reading" is increasing. In such an apparatus, reading of both the front and back surface of the original is performed by one-time conveying of the original. Such original reading apparatus intends to respond to the needs to efficiently transform a document into an electronic format. To improve efficiency in reading, two original reading apparatuses are provided in the original reading apparatus. When performing "double-side simultaneously reading", first, the image data of the front surface of the original and that of the back surface of the original read are sequentially output to a data output line. Then, the image data read is temporarily stored in a memory of the apparatus. Thereafter, the stored image data is sequentially read from the memory.

Further, there is known an information processing apparatus such as the copying machine and the like which temporarily stores the image data read in the original reading apparatus in the memory, such as a hard disc, DRAM (Dynamic Random Access Memory) and the like. In case of a copying machine, the image data is repeatedly read for the desired number of printings in an arbitrary order to print out the image. This type of copying machine controls such that an identical original image obtained by one-time reading is read from the memory for a plurality of times in an appropriate order.

As mentioned, in the information processing apparatus such as the copying machine and the like, frequently, the image data of the original is temporarily stored in the memory of the apparatus. In this case, the image data is temporarily stored in the memory of the apparatus. Due to this, when printing is finished, the image data remains in the memory of the apparatus. Therefore, the remaining data may be read by a third party unless it is overwritten by new data. The remaining data may include the contents of the document and the like which is highly confidential. Thus, some mechanism to promptly erase data in the memory to secure confidentiality and privacy is required.

To this problem, some methods for erasing data in the document from the memory after the printing and the like are disclosed in Japanese Patent Application Laid-open Nos. 2005-236578 and H09-223061.

In the Japanese Patent Application Laid-open No. 2005-236578, an image forming apparatus is provided. The image forming apparatus is capable of preventing leakage image data temporarily stored in the original image read means of the image forming apparatus. To prevent leakage of secrets, the image forming apparatus is formed such that the erasure of the image data will be finished almost simultaneously with completion of image data transfer. However, in such a configuration, reading, transferring and overwriting for erasure of the image data need to be performed in parallel, which takes time in processing. In addition, this makes the circuit complicated and increase in size thereby increasing the cost.

Japanese Patent Application Laid-open No. H09-223061 provides a method and device for processing information which can input/output information based on management information while keeping secrecy. In the Japanese Patent Application Laid-open No. H09-223061, it is determined whether a secret document mode is set or not, and when that mode is not set, image data read is stored in a hard disk together with a file allocation table (FAT). When the stored image data are output, the processing is immediately finished. When the secret document mode is set, the image data read is stored in the hard disk together with the FAT. After the stored image data are output, the image data stored in the hard disk and the FAT corresponding to the image data are erased. Then, the processing is finished. Such a configuration enables to surely maintain confidentiality, however, it takes time to discriminate whether it is in the secret document mode or not.

Further, such "double-side simultaneously reading" may be performed as follows. First, the image data of the front surface and the back surface read are output to the data output line in order. Then, the image data read is temporarily stored in a memory of the apparatus. Thereafter, the image data stored is sequentially read from the memory in an order of the front surface and the back surface for every page to transfer the image data read.

When the operation of reading and transferring the image data is performed in parallel with the operation of overwriting for erasure of the image data, access speed or access band to the memory which performs each processing in parallel may be insufficient according to the memory used or its configuration. This prevents the image data from being read and output from the memory at a desired speed. If an operating speed of the memory is accelerated for obtaining desired speed, amount of energy consumption is increased. Further, if the width of the memory data bus is increased to increase the access band to the memory, the cost may be increased.

Due to such restriction, it is sometimes configured such that, after the operation of reading and transferring the image data is completed, the operation of overwriting erasure is performed to the image data stored in the memory. When configured as above, it takes time from the completion of the operation of reading and transferring the image data to the completion of the operation of overwriting for erasure of the image data. Further, due to such a configuration, until the operation of overwriting for erasure of the data is completed, reading of the original to be read next (next original) is not accepted. Thus, it takes time to perform the overwriting for erasure processing and may give influence in convenience of use of the apparatus.

SUMMARY OF THE INVENTION

An information processing apparatus of the present disclosure includes: a storing unit configured to store image data; a writing unit configured to write image data in the storing unit; a reading unit configured to read the image data stored in the storing unit; a refresh processing unit configured to perform refresh processing at a predetermined frequency to hold the image data stored in the storing unit; and a control unit. The control unit is further configured to: control the writing unit to write, after the image data is read from the storing unit, data which is different from the image data read in the storing unit as dummy data; and reduce, when writing the dummy data, the frequency of the refresh processing to be less than that of the refresh processing when the image data read is stored in the storing unit.

Further features of the present invention will become apparent from the following description of exemplary embodiments (with reference to the attached drawings).

DESCRIPTION OF THE EMBODIMENTS

Embodiments of the present disclosure are described in detail below. According to the present disclosure, an information processing apparatus for rapidly erasing image data stored in the memory of the apparatus is provided. In the following embodiments, a DRAM is used as an image data storing unit. In the DRAM, refresh processing, which is intermittently required to hold the stored data, is performed. After the image data is output, frequency for executing the refresh processing, which is the processing to hold data, is decreased. Thus, the time required for the processing necessary to perform the processing to hold data, is reduced.

Due to the decrease of the frequency to execute the refresh processing, the contents of the data left in the DRAM cannot be held. Thus, as the time elapses, errors are caused and a recovery of the data becomes difficult. Further, by performing processing to erase the stored data after the data is output, the data can be erased with more certainty. In this case, the frequency to execute the refresh processing is decreased during the processing to erase data. Thus, the time required for the refresh processing can be reduced so that the data can be erased at high speed.

First Embodiment

Figure 1:
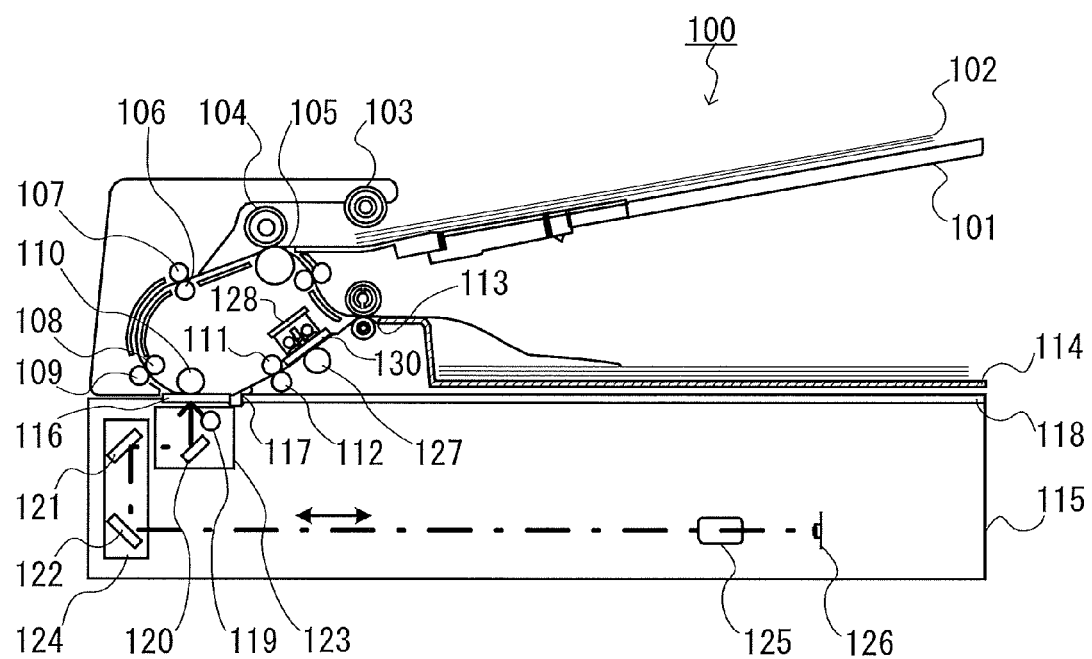
FIG. 1 is a configuration diagram of an original reading apparatus.
Figure 2:
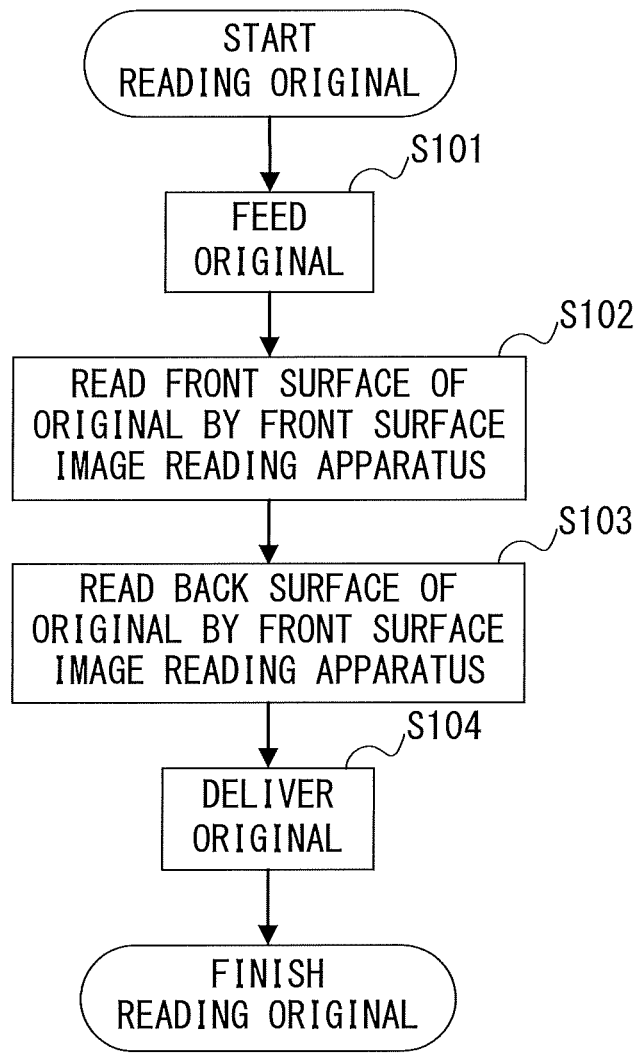
FIG. 2 is a schematic flowchart of an original reading operation.

FIG. 1 shows a configuration of an original reading apparatus including an auto document feeder therein as an example of an information processing apparatus such as an image reading apparatus and the like. FIG. 2 is a schematic flowchart of an original reading operation which is performed by the original reading apparatus. The detail thereof will be described later.

A sheet feeding roller 103 is connected to the same driving source as a separation conveyance roller 104. As the feeding roller 103 rotates, the separation conveyance roller 104 rotates to feed the original. Normally, the sheet feeding roller 103 is retracted at a home position shown above in FIG. 1 so as not to obstruct setting of the original. Once the sheet feeding operation is started, the sheet feeding roller 103 descends to contact with an upper surface of the original 102. Since the sheet feeding roller 103 is supported by an arm (not shown), when the arm swings, the feeding roller 103 vertically moves.

A separation conveyance driven roller 105 is arranged opposite to the separation conveyance roller 104, with the separation conveyance driven roller 105 pressed to the separation conveyance roller 104 side. The separation conveyance driven roller 105 is formed of rubber material and the like which has a slightly less friction than the separation conveyance roller 104. In cooperation with the separation conveyance roller 104, the separation conveyance driven roller 105 feeds the original 102, fed by the sheet feeding roller 103, on an original tray 101 one by one.

Further, the auto document feeder 100 comprises resist roller 106, a resist driven roller 107, a lead roller 108 and a read driven roller 109. The resist roller 106 and the resist driven roller 107 cooperate so as to align the leading edge of the original as fed. In this embodiment, the leading edge of the original is aligned by abutting the leading edge of the original as separated to a nip portion of the pair of the resist rollers 106 and 107 in a stationary state.

The lead roller 108 and the driven roller 109 convey the original 102 to the original flow reading glass 116. A platen roller 110 is arranged above the original flow reading glass 116. The original 102 passes through on the original flow reading glass 116, which is a first reading section, by the platen roller 110. Thereafter, the original 102 is conveyed to a lead delivery roller 111 and a lead delivery driven roller 112. A jump table 117, for picking up the original, is provided at the end of the lead delivery roller 111 on the original flow reading glass 116 to make smooth conveyance of the original to the lead delivery roller 111.

The original is conveyed such that its front surface contacts the original flow reading glass 116. In this case, a charged coupled device (CCD) line sensor 126, arranged in the original reading apparatus 115 reads the front surface of the original via an original flow reading glass 130.

The lead delivery roller 111 and the lead delivery driven roller 112 convey the original having passed through on the original flow reading glass 116 to the original flow reading glass 130. On one side of the original flow reading glass 130, a platen roller 127 is provided. On the other side of the original flow reading glass 130, a contact image sensor (CIS) line sensor 128 is provided. With this configuration, an image of the back surface of the original 102, which passes through between the original flow reading glass 130 and the platen roller 127, is read by the CIS line sensor 128. Thereafter, the original 102 is conveyed to a delivery roller 113 and is then delivered onto a delivery tray 114.

In the following, details of the original reading processing by the auto document feeder 100 will be explained with reference to FIG. 2. First, the original, placed on the original tray 101 with the front surface thereof turned up, is fed to the original flow reading glass 116 (S101). When the original 102 passes through on the original flow reading glass 116, the CCD line sensor 126, arranged in the original reading apparatus 115, reads the information of the image of the front surface of the original (S102).

When S102 is finished, the original 102 passes through the jump table 117, the lead delivery roller 111 and the lead delivery driven roller 112. Then, the original 102 is conveyed between the platen roller 127 and the original flow reading glass 130, which is a second reading section. The image of the back surface of the original 102, passing through between the original flow reading glass 130 and the platen roller 127, is read by the CIS line sensor 128 (S103). The original 102, having passed through between the original flow reading glass 130 and the platen roller 127, is delivered onto the delivery tray 114 by the delivery roller 113 (S104).

The original reading apparatus 115 as mentioned comprises a lamp 119 and mirrors 120, 121 and 122. The lamp 119 irradiates light to the surface of the reading original. The mirrors 120, 121, and 122 guide reflection light from the original 102 to a lens 125 and the CCD line sensor 126. The lamp 119 and the mirror 120 are mounted to a first mirror table 123. Also, the mirrors 121 and 122 are mounted to a second mirror table 124.

The mirror tables 123 and 124 are connected, by a wire (not shown), to a driving motor (not shown) and move parallel to a platen glass 118 according to rotation of the driving motor. The reflection light from the original is guided to the lens 125 through the mirrors 120, 121 and 122. Then, an image is formed in a receiving part of the CCD line sensor 126 by the lens 125. The CCD line sensor 126 performs photoelectric conversion of the formed reflected light by a light receiving element and outputs electric signals according to the incident light amount. The CIS line sensor 128 also performs the photoelectric conversion of the reflected light from the original 102, to which light is irradiated by a lamp provided in a unit for reading the image of the back surface, and outputs the electric signal according to the incident light amount.

The original reading apparatus having the above configuration can read the original in two modes. A first mode is an original fixed reading mode, in which the original 102 placed on the platen glass 118 is read while moving the first mirror table 123 and the second mirror table 124 in a sub-scanning direction (i.e., the direction shown by an arrow in FIG. 1). A second mode is an original flow reading mode, in which, in a state where the first mirror table 123 and the second mirror table 124 are stopped, the auto document feeder 100 conveys the original 102 to read the original at the position where the position of the original flow reading glass 116 is provided. In the second mode, in addition to the CCD line sensor, the CIS line sensor 128 is used. Due to this, in addition to the image of the front surface of the original, the image of the back surface of the original can be read.

Figure 3:
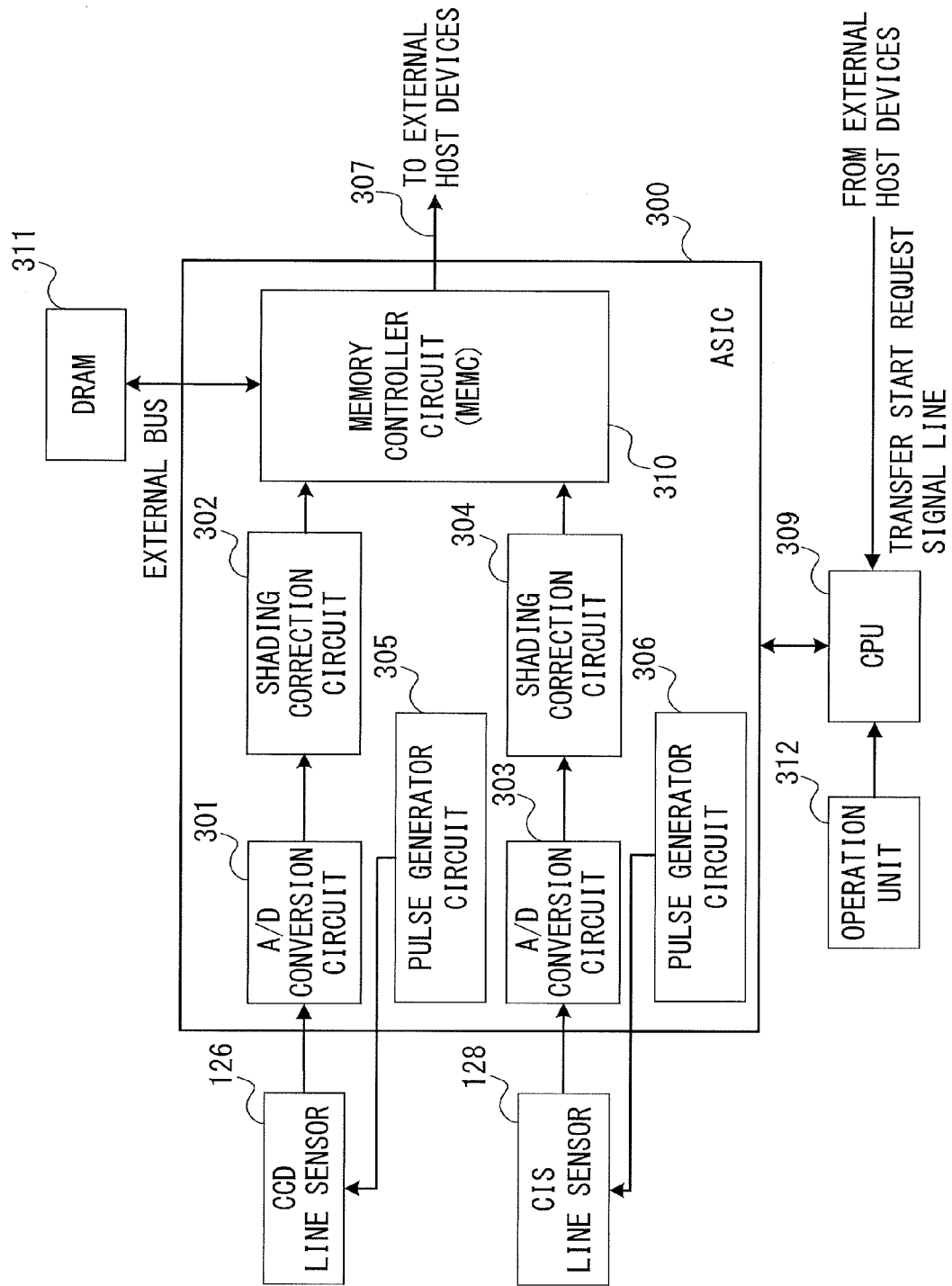
FIG. 3 is a functional block diagram of an apparatus which performs image reading and transferring processing.

FIG. 3 illustrates a functional block diagram of an apparatus which performs reading and transferring processing of the image performed in the auto document feeder 100 according to the present embodiment. A control circuit of the present embodiment includes an application specific integrated circuit (ASIC) 300. The ASIC 300 comprises a pulse generator circuit 305, in which, pulse to drive the CCD line sensor 126 for reading the front surface of the original, is generated therein. Further, the ASIC 300 comprises an A/D conversion circuit 301 and a shading correction circuit 302. The A/D conversion circuit 301 converts analog signals from the CCD line sensor 126 into digital signals. The shading correction circuit 302 performs shading correction to the image data digitally converted by the A/D circuit 301. The signal output from the shading correction circuit 302 is an input to an MEMC 310.

The ASIC 300 comprises a pulse generator circuit 306, in which, pulse to drive the CIS line sensor 128 for reading the back surface of the original, is generated therein. Further, the ASIC 300 comprises an A/D conversion circuit 303 and a shading correction circuit 304. The A/D conversion circuit 303 converts analog signals from the CIS line sensor 128 into digital signals. The shading correction circuit 304 performs shading correction to the image data digitally converted by the A/D conversion circuit 303. The signal output from the shading correction circuit 304 is input to a memory controller circuit (MEMC) 310 provided in the ASIC 300. The MEMC 310 is connected to a dynamic random access memory (DRAM) 311, which serves as an image data storage means, by an external bus. The DRAM 311 temporarily stores the image data output from the shading circuits 302 and 304. Further, the ASIC 300 comprises a data output line 307 which transfers the image data from the DRAM 311 to external devices. An image data output unit is formed by the MEMC 310 and the data output line 307. Then, the image data is output from the DRAM 311 to the external host devices (such as a PC, printer and the like).

The control circuit of the present embodiment comprises, in addition to the circuits mounted on the ASIC 300, a central processing unit (CPU) 309 which controls the overall original reading operation. The operation unit 312 is an interface with a user, which is configured to receive an instruction to start reading from the user, which is to be recognized by the CPU.

The CPU 309 comprises a transfer start request signal line which receives a request to start transferring the image data from the external host devices connected to the data output line 307. Based on the request to start transferring, the CPU 309 controls the MEMC 310 and outputs the image data stored in the DRAM 311 to the data output line 307.

Figure 4:
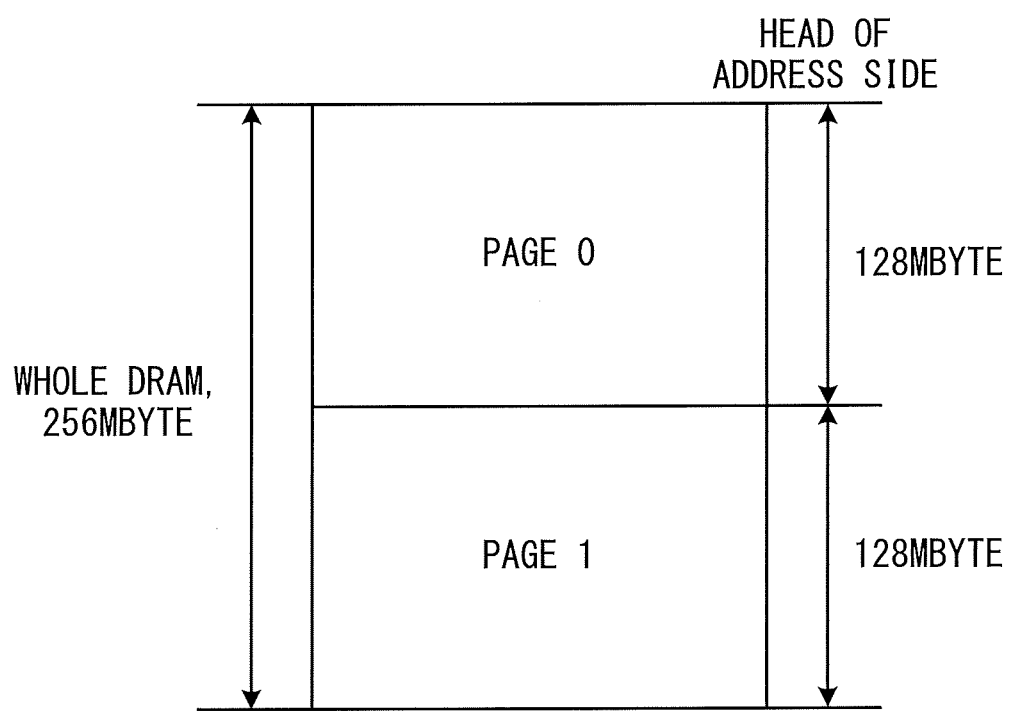
FIG. 4 is an explanatory diagram of a memory area in DRAM 311.

Next, details of the MEMC 310 and the DRAM 311 will be described. The DRAM 311, having capacity of 256 Mbyte, in this embodiment, is capable of storing two sheets of A4 color image data. In case of the A4 color image data of 600 dpi consisting of R, G, B, each color having 8 bits, (297 [mm])*(210 [mm]) corresponds to (7016 pixels)*(4960 pixels)*24 bits, thereby about 104.5 Mbyte is required. FIG. 4 illustrates a diagram for explaining a memory area of the DRAM 311. As shown in FIG. 4, DRAM 311 having 256 Mbyte is divided into two areas, one is a first half of an address and the other is a latter half of the address, each having 128 Mbyte (the divided area is hereinafter referred to as "page"). When the DRAM 311 is used in this way, the two sides can be used to store data.

By an instruction from the CPU 309, the MEMC 310 is configured to allow writing the image data from the CCD line sensor 126 and the CIS line sensor 128 in a page (page 0 or page 1) specified by the CPU 309. Further, the MEMC 310 is configured to read the image data stored in the page specified by the CPU 309 to the data output line 307. Further, the MEMC 310 has a function to notify the CPU 309 of completion of reading the image data stored in the page specified by the CPU 309.

Upon receiving a dummy data overwrite instruction from the CPU 309, the MEMC 310 writes data as dummy data in an area where at least the image data is stored in the DRAM 311. The data written is, for example, different from the image data which has nothing to do with the image data. In this embodiment, the area where the image data is stored is not identified, rather, by sequentially overwriting data '1' from a head address over the whole area in DRAM 311, the image data is overwritten and erased. Needless to say, the area where the image data is stored may be identified. Then, overwrite by the dummy data may be performed only to the identified area. Note that, in this embodiment, the value '1' is written as the data which is overwritten in the DRAM 311 and which has no relation with the stored image data. However, as long as the data can be overwritten and erased, any value can be used as such data. For convenience of explanation, in this embodiment, processing to overwrite such value is described as dummy data overwrite processing.

While the dummy data overwrite processing is being performed, the MEMC 310 is configured to reject 1) an instruction to write the image data from the CCD line sensor 126 or the CIS line sensor 128, and 2) an instruction to read the image data from the page specified by the CPU 309. It means that while the dummy data overwrite processing is being performed, other processing cannot be operated in parallel. Further, even the overwriting for erasure of all the stored data is not finished, the dummy data overwrite processing can be interrupted by an instruction from the CPU 309. When the processing is interrupted, CPU 309 receives a notification identifying the area at which the overwriting for erasure is terminated. Further, when the whole area is overwritten by the dummy data, the MEMC 310 notifies the CPU 309 of the completion of the processing.

Here, details of how the MEMC 310 access the DRAM 311 through an external bus is described. The MEMC 310 accesses the DRAM 311 only when performing the function of data overwriting for erasure as above. In this case, the MEMC 310 accesses the DRAM 311 which is not the DRAM 311 in which and from which the image data from the CCD line sensor 126 and the CIS line sensor 128 are written and read.

Figure 5:
FIG. 5 is a timing chart when MEMC (Memory Controller Circuit) accesses DRAM.

While the MEMC 310 accesses the DRAM 311 in which the writing operation and the reading operation are being performed, writing processing of the image data from the CCD line sensor 126 and the CIS line sensor 128, and reading processing to the data output line 307 to the host side are controlled in time division. FIG. 5 is an access timing chart illustrating accesses from the MEMC 310 to the DRAM 311 through an external bus. As shown in FIG. 5, refresh instruction is performed to the DRAM 311 at predetermined intervals. The refresh instruction is processing which is intermittently required to hold data stored in the DRAM.

In FIG. 5, processing to write the image data from the CCD line sensor 126 in the DRAM 311 is described as "Write A". Further, processing to write the image data from the CIS line sensor 128 in the DRAM 311 is described as "Write B". Processing to read the image data to the data output line 307 of the host side is described as "Read". Further, in FIG. 5, the refresh instruction is described as "R".

Figure 6:
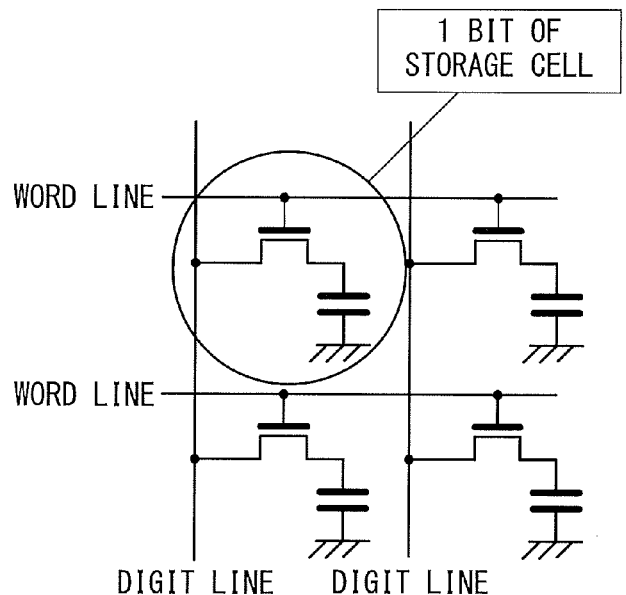
FIG. 6 is an explanatory diagram of a detailed configuration of DRAM.

In the following, the refresh instruction to the DRAM 311 is explained. FIG. 6 illustrates an explanatory diagram of the detailed configuration of the DRAM 311. As shown in FIG. 6, in the DRAM 311, which is of a general type, 1 bit of storage cell includes one MOS transistor and one capacitor. By determining whether electric charge is accumulated in the capacitor or not, information is stored. The DRAM 311 has more than one storage cells of this configuration. In the storage cell of this configuration, due to leak current of the MOS transistor, the electric charge accumulated in the capacitor leaks little by little over time, which prevents the DRAM from holding the stored data. Then, it becomes necessary to perform reading and rewriting the information before the leakage amount of the electric charge exceeds a predetermined value. This processing is called refresh processing. The general DRAM 311 requires this processing.

Further, the DRAM 311, which is of a general type, is configured to automatically perform the refresh processing in the DRAM 311 when the refresh instruction is given. In case of the DRAM 311 used in this embodiment, it is required to issue the refresh instruction at high frequency of 8192 times in 64 [msec] to perform refresh processing. As mentioned, this refresh processing is the processing performed such that the written data is ensured to be maintained. In other words, if it is not necessary to maintain the data, the refresh processing is not needed. Thus, the frequency to issue the refresh instruction may be reduced or the refresh processing may not be performed.

Here, to prevent leakage of secrets, when dummy data overwrite processing is performed to the data of documents having a high confidentiality with value such as "1" and the like, the overwritten data does not have any meaning so that it is not necessary to hold and secure the data. Thus, after the dummy data overwrite processing is started, the frequency to issue the refresh instruction can be reduced to reduce the frequency of the refresh processing. In this embodiment, after the dummy data overwrite processing is started, the frequency to issue the refresh instruction is reduced to 0 (zero) so as not to perform the refresh processing. Then, until the processing to overwrite the image data with the dummy data is substantially completed, the frequency to issue the refresh instruction remains low.

After the dummy data overwrite processing is completed, the frequency to issue the refresh instruction is returned to normal frequency. Thereafter, when it becomes necessary to perform writing of data in the DRAM 311, to normally hold the data written, it becomes necessary to first return the frequency to issue the refresh instruction to the normal frequency and then performing writing of data.

Note that, if the refresh processing is not performed, the data cannot be held due to the leakage as above. Thus, in one embodiment, it is possible to eliminate dummy data overwriting. In this case, the refresh instruction is not issued, thereby the maintaining process of the data is stopped. However, it is noted that the leakage amount varies in each bit of the storage cell. Therefore, actually, even no refresh processing is performed for 64 [msec] as above, a part of the data may be held. Thus, in this embodiment, to prevent leakage of secrets of the documents and the like having a high confidentiality, it is preferred that the data stored in the DRAM is overwritten and erased without fail by performing the dummy data overwrite processing.

In the following, time required for overwriting for erasure in a case where the refresh instruction is performed and where the refresh instruction is not performed is considered on the basis that refresh processing is performed 8192 times in 64 [msec] and takes 400 [nsec] for refresh processing to one refresh instruction. In this embodiment, it is assumed that the operation CLK of the DRAM 311 is defined 400 [MHZ] (800 [Mbps]) and 200 operation CLK time is required for performing 256 byte write. In this case, the time required to perform write in the area having 256 Mbyte is about 200 [msec] and takes about 10 [msec] for refresh processing. Thus, when the dummy data overwrite processing is performed without performing the refresh instruction, the dummy data overwrite processing can be performed by reducing time of about 10 [msec] as compared to a case where the refresh instruction is performed. Note that time required for the refresh processing changes depending on the DRAM 311 used or a circuit configuration. Thus, the above number is only one of the examples.

Next, description is given on how the MEMC accesses the DRAM 311 through an external bus when the dummy data overwrite processing is performed. In this case, processing of writing of the image data from the CCD line sensor 126 and the CIS line sensor 128 and reading to the data output line 307 are not performed. Instead, the dummy data overwrite processing, from a head address to an end address in order, is performed. Also, at this time, the refresh processing is not performed to the DRAM 311. Instead, only the dummy data overwrite processing is performed.

Figure 7:
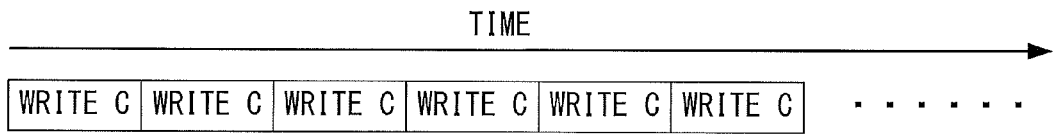
FIG. 7 is a timing chart representing an operation of MEMC for access to DRAM.
Figure 8:
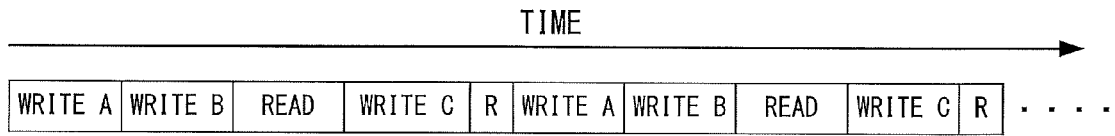
FIG. 8 is a timing chart representing an operation of MEMC for access to DRAM.

FIG. 7 is an access timing chart, in which timing at which the DRAM 311 accesses the MEMC 310 through an external bus when the dummy data overwrite processing is performed, is illustrated. As shown in FIG. 7, when the dummy data overwrite processing is performed, no refresh processing is performed. Controlling as above, past image data left in the DRAM 311 can be overwritten and erased at the highest speed. Further, as shown in FIG. 5, when write and read are processed by the DRAM 311 in time division, following processing may be performed. Further, it is possible to overwrite the area in which reading has been completed while reading, for overwriting the past image data. FIG. 8 illustrates the timing chart in this case. In FIG. 8, write C shown in FIG. 7 is added to the timing chart shown in FIG. 5.

When performing control as above, in a method in which only the overwriting processing is performed without performing the refresh processing, accelerating the processing speed cannot be achieved. This is because it is necessary to perform the refresh processing to the data to be read so as not to cause an error in the data by the leakage.

As an example of the original reading operation, an operation to read A4 original is explained with reference to the flowchart in FIG. 9. When an instruction to start reading the original is received from the operation unit 312, the CPU 309 conveys the original stacked on the original tray 101 by the sheet feeding roller 103 from the top of the original to the pair of the separation conveyance rollers 104 and 105. When one or more originals are overlappingly conveyed, the originals are separated by the separation conveyance roller 104 and the separation conveyance driven roller 105. Then, the original is conveyed (S202).

The leading edge of the original is aligned by the pair of the resist rollers 106 and 107, positioned downstream side. Then, passing through the pair of the lead roller pair 108 and 109, the original is conveyed to the first reading section (front surface reading section) (S203). Thereafter, just before the original reaches the first reading section, the CPU 309 gives an instruction to the MEMC 310 to read and store the image data in page 0 of the DRAM 311 by the CCD line sensor 126 (204).

The CPU 309 keeps conveying the original and starts reading the original by the CCD line sensor 126 (S205). Then, the original 102 is conveyed, passing through the lead delivery rollers 111 and 112, to the second reading section (back surface reading section) (S206). Then, just before the original reaches the second reading section, the CPU 309 gives an instruction to the MEMC 310 to read and store the image data in the page 1 of the DRAM 311 by the CIS line sensor 128 (S207).

The CPU 309 keeps conveying the original and starts reading the original by the CIS line sensor 128 (S208). Then, the original is conveyed by the delivery roller 113. The original is then delivered to the delivery tray (S209). Next, the CPU 309 determines the presence/absence of a transfer start request of the front surface image data from a host connected to the data output line 307 (S210). If it is determined that there is no transfer request, the CPU 309 again determines the presence/absence of the transfer request (S210: N). If it is determined that there is a transfer request (S210:Y), the CPU 309 controls the MEMC 310 to read the image data in the page 0 of the DRAM 311 stored from the DRAM 311 to transfer the data read to the data output line 307 (S211). Thereafter, the CPU 309 determines whether the reading and transferring of the image data in the page 0 has been finished or not (S212). In the embodiment 1, if a read and transfer notification is not received from the MEMC 310, it is determined that the transfer is not finished (S212: Y). If the read and transfer notification is received, it is determined that the transfer is finished (S212: Y). Thereafter, the CPU 309 determines whether a transfer start request of the back surface image data is notified from the host side (S213). If such a request is not notified, the CPU 309 repeats the determination processing again (S213: N). If the transfer start request of the back surface image data is notified (S213:Y), the CPU 309 controls the MEMC 310 to read the image data in the page 1, in which the back surface image data is stored, to transfer the data read to the data output line 307 (S214).

The CPU 309 determines whether reading and transferring, performed by MEMC 310, of the image data in the page 1 is finished or not (S215). If the read and transfer completion is not notified, the CPU 309 repeats the step of determination. If notified, the CPU 309 determines that the transfer is finished. Thereafter, the CPU 309 determines whether there is the original to be read next (next original) on the original tray 101 (S216). If it is determined that there is the original (S216: Y), the CPU 309 returns to the processing of S201. If it is determined that there is no next original (S216: N), the CPU 309 controls the MEMC 310 to perform the dummy data overwrite processing of the DRAM 311 (S217). In this case, the CPU 309 reduces the refresh frequency. In this example, the refresh processing is not performed.

Further, the CPU determines whether the dummy data overwrite processing is finished or not (S218). If completion notification of the dummy data overwrite processing is not received from the MEMC 310, the CPU 309 repeats the processing again (S218: N). If the completion notification is received (S218: Y), the CPU 309 returns the frequency of the refresh processing to the normal frequency. That is, the CPU 309 returns the frequency of the refresh processing to the frequency which is sufficient to hold the data. Then, the CPU 309 finishes the processing. Note that it is not necessary to return the refresh frequency to the normal frequency right away. It may be returned to the normal frequency when the image data and like is stored in the DRAM 311.

Due to the configuration as above, the overwrite processing can be accelerated by performing the dummy data overwrite processing after the image data stored in the DRAM 311 is read, and by not performing the refresh processing while the dummy data overwrite processing is performed.

Second Embodiment

In the second embodiment, while the dummy data overwrite processing of the DRAM 311 is being performed in the apparatus similarly configured as that used in the embodiment 1, an instruction to read the next original is requested from the operation unit 312. FIG. 10 shows the processing flow thereof. When an instruction to read the next original is received while the dummy data overwrite processing of the DRAM 311 is being performed, the CPU 309 basically performs the Steps from S201 to S218 shown in FIG. 9 in order to perform the dummy data overwrite processing. Here, in the first embodiment, the image data from the CCD line sensor 126 is stored in the page 0 of the DRAM 311. Also, the image data from the CIS line sensor 128 is stored in the page 1 of the DRAM 311.

In the second embodiment, depending on the progress of the dummy data overwrite processing, storage destination of each image data is determined. As shown in the flowchart in FIG. 10, when the instruction to read the next original is received, the CPU 309 determines whether the dummy data overwrite processing in S218 in FIG. 9 is finished or not (S301). If it is determined that the dummy data overwrite processing is finished (S301: Y), the CPU 309 returns the refresh frequency to the normal frequency and then, proceeds to S201 in FIG. 9 and performs processing in FIG. 9 (S308). If it is determined that the dummy data overwrite processing is not finished (S301: N), the CPU 309 determines whether or not the instruction to start reading the next original is given from the operation unit 312 before the dummy data overwrite processing to the whole area of the DRAM 311 by the MEMC is completed (S302).

If it is determined that the instruction to start reading the next original is not given from the operation unit 312 (S302: N), the CPU 309 repeats the determination again. If the instruction to start reading the next original is set from the operation unit 312 before the dummy data overwrite processing is completed (S302: Y), the CPU 309 controls the MEMC 310 to stop the dummy data overwrite processing (S303). Next, the CPU 309 confirms that the dummy data overwriting for erasure in the area of the DRAM 311 through the MEMC 310 (S304). The CPU 309 determines whether the page 0 area of the DRAM 311 has been wholly erased or not (S305).

Figure 11:
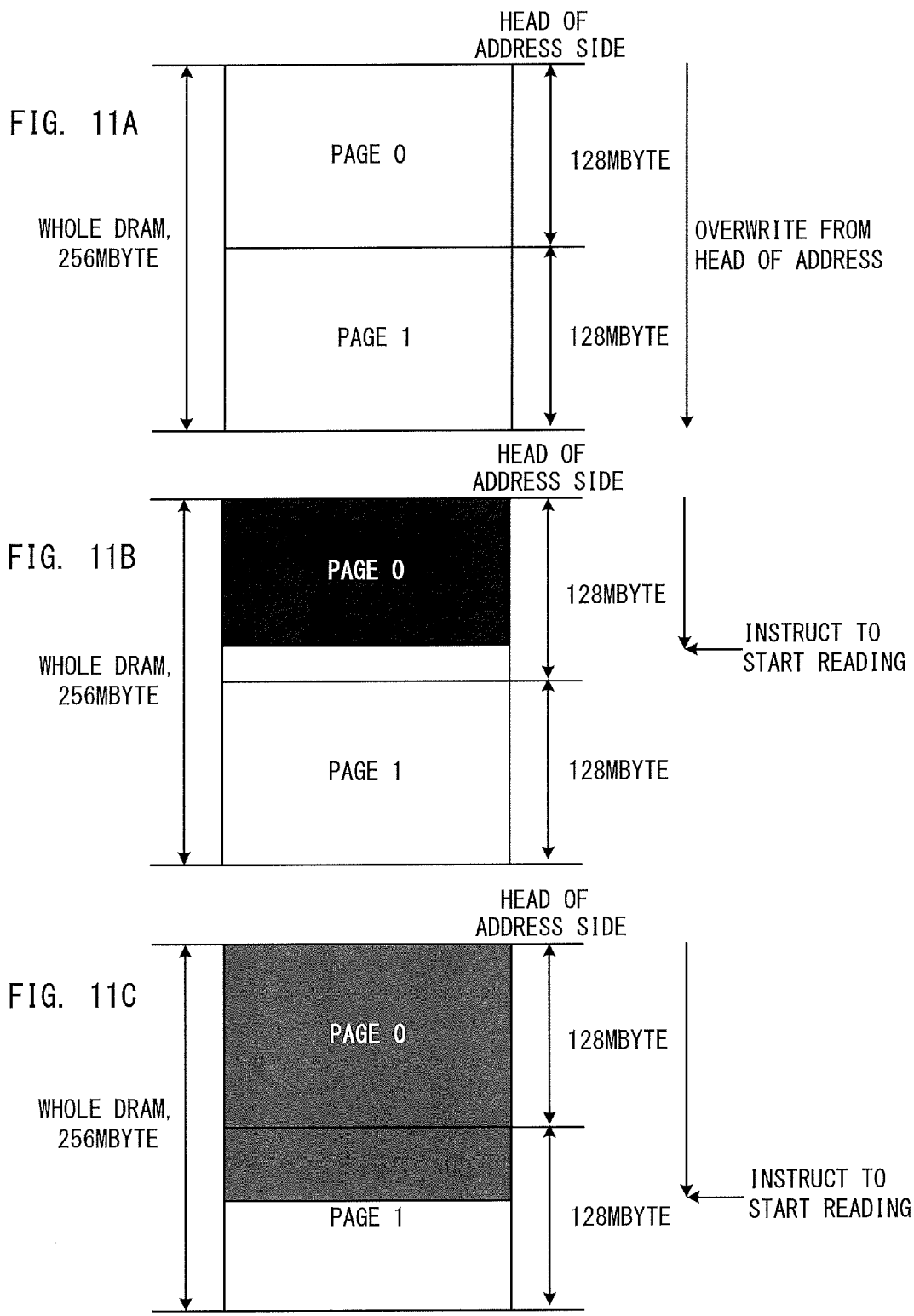
FIGS. 11A, 11B, and 11C are explanatory diagrams each illustrating relation between a memory area in DRAM and an area of overwriting for erasure of data in DRAM.

FIGS. 11A, 11B and 11C are diagrams each illustrating an image diagram of the area where overwriting for erasure is applied in the DRAM 311. The range of erasure is defined by lapse of time from the dummy data overwrite processing of the MEMC 310 by the control of the CPU 309 is started to the original reading instruction is requested.

As shown in FIG. 11A, the DRAM 311 is divided into two. One is an area having 128 Mbyte from the head of the address, where is defined as page 0. The other is an area having 128 Mbyte next to the page 0, where is defined as page 1. The dummy data overwrite processing is sequentially performed from the head of the address. The CPU 309 causes the dummy data overwrite processing to stop when the instruction to start reading the next original is given. In this case, according to the timing of the instruction to start reading, the state of the dummy data overwrite processing will be in either one of the following states: (1) a state where the processing is progressed to the middle of the page 0 area of the DRAM 311 (FIG. 11B); or (2) a state where the dummy data overwrite processing progresses to the middle of the page 1 area of the DRAM 311 (FIG. 11C). Thereafter, based on the notification from the MEMC 310, the CPU 309 confirms the state of the dummy data overwrite processing.

Here, when the image data of the CCD line sensor 126 is written, the data stored in the DRAM 311 is erased. Thus, if there are areas where the dummy data overwrite processing has already been completed and not yet completed, it is preferred that writing of the image data is started from the area where the dummy data overwrite processing is not yet completed.

In the state shown in FIG. 11B, the dummy data overwrite processing to the page 0 of the DRAM 311 is in the middle of processing. That is, the dummy data overwrite processing is not yet completed so that the dummy data overwrite processing is not performed to the page 1. Thus, if the overwrite to the page 0 is not completed (S305: N), the CPU 309 starts to write the image data from the page 0 in a similar manner to that of the embodiment 1. In this case, the CPU 309 returns the refresh frequency to the normal frequency, and then, proceeds to the processing of S201 shown in FIG. 9 (S306).

On the other hand, in the state shown in FIG. 11C, the dummy data overwrite processing to the page 0 of the DRAM 311 is completed and the dummy data overwrite processing to the page 1 is not completed. Thus, if the overwrite to the page 0 is completed (S305: Y), the CPU 309 selects the page 1 on which the image data from the CCD line sensor 126, which is the latest image data written, is written. Thereafter, the CPU 309 returns the refresh frequency to the normal frequency, and then, proceeds to the processing of S401 shown in a flowchart in FIG. 12 (S307).

Figure 9:
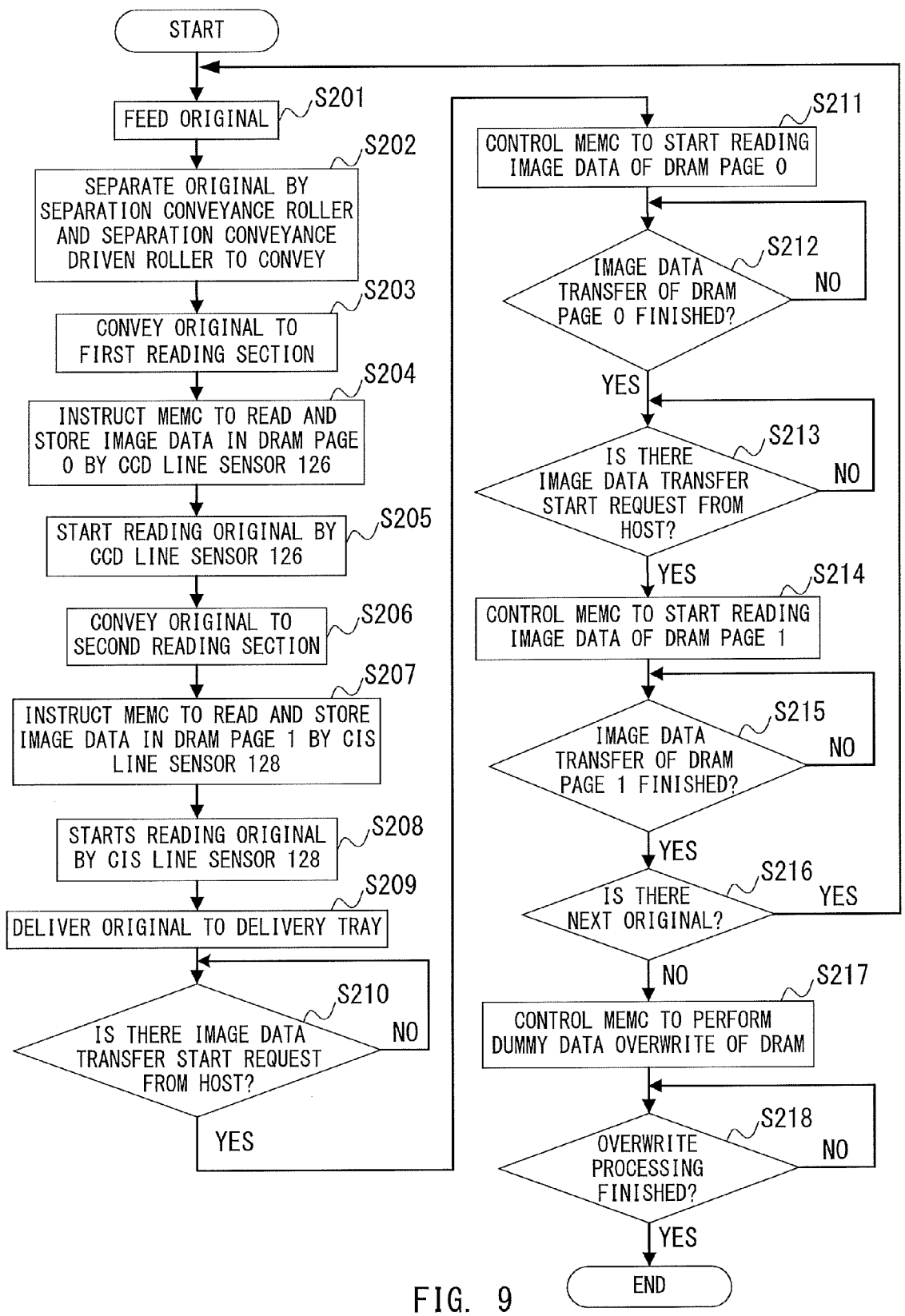
FIG. 9 is a flowchart of an original reading operation.
Figure 10:
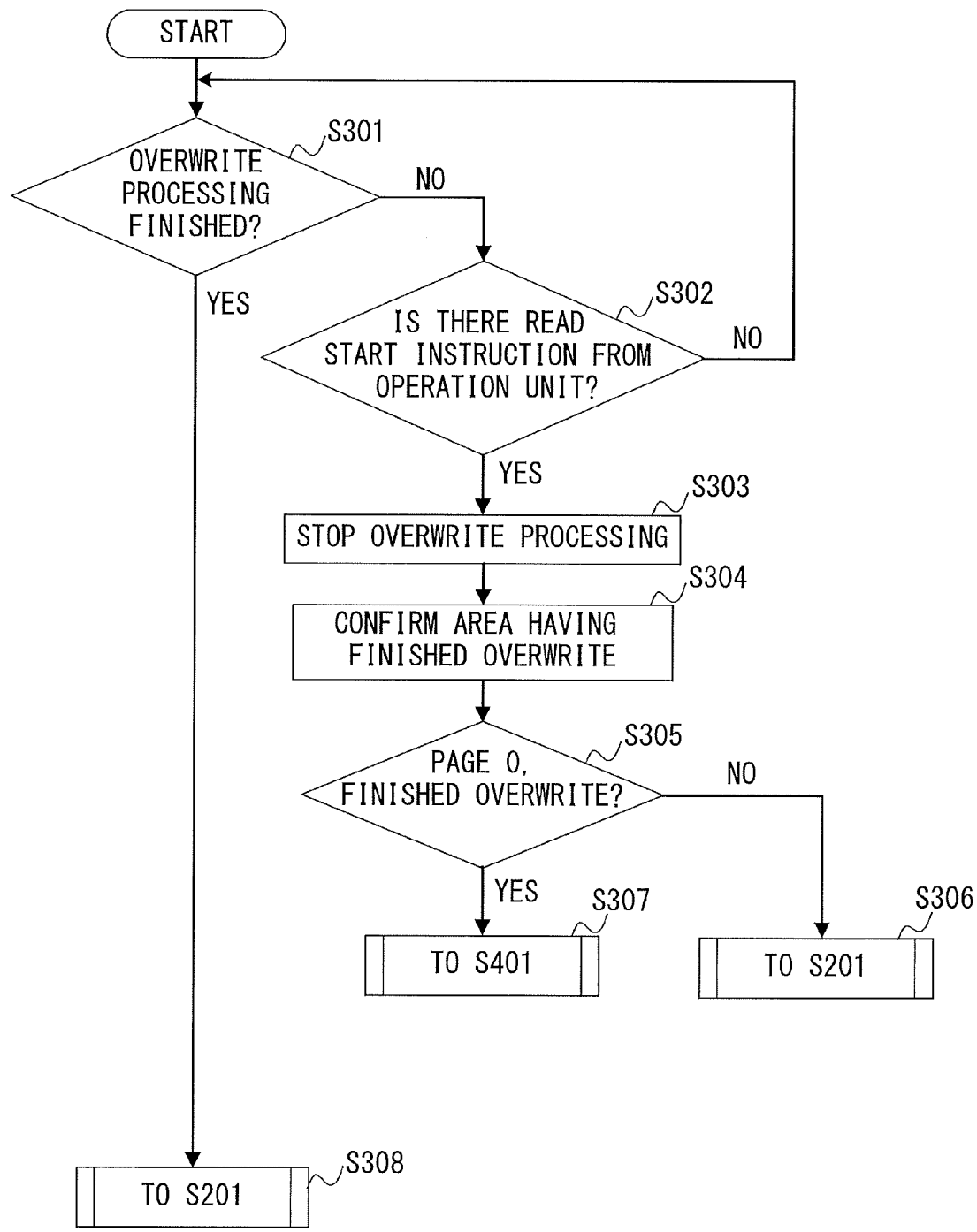
FIG. 10 is a schematic flowchart of overwriting for erasure of data in DRAM and original reading operation.
Figure 12:
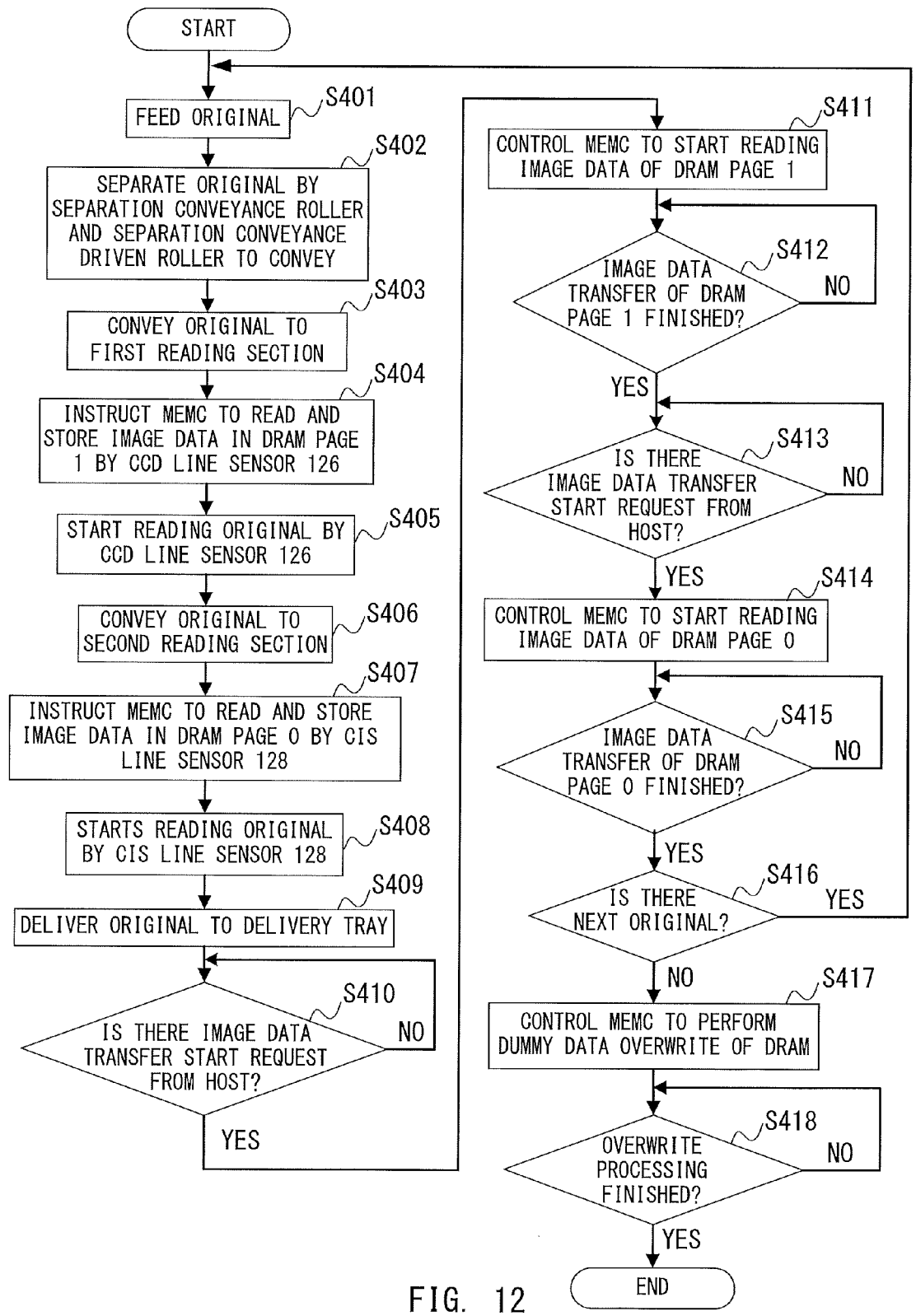
FIG. 12 is a flowchart of an original reading operation.

FIG. 12 is a flowchart in which the operation of S204, S207, S211, S212, S214, and S215 in the flowchart in FIG. 9 is modified. Therefore, though S404, S407, S411, S412, S414, and S415 in the flowchart in FIG. 12 respectively correspond to S204, S207, S211, S212, S214, and S215 in the flowchart in FIG. 9, the operations thereof are not identical. On the other hand, the other steps in FIG. 12, in particular, S401 to S403, S405 to S406 etc., respectively correspond steps in FIG. 9, i.e., S201 to S203, S205 to S206 etc., and the operations thereof are identical.

Similar to S201 and S201 in the flowchart in FIG. 9, the CPU 309 performs processing including feeding, conveying and the like of the original (S401, S402). Thereafter, the CPU 309 conveys the original to the first reading section (S403) and just before the original reaches the first reading section, the CPU 309 gives an instruction to the MEMC 310 to store the image data of the CCD line sensor 126 in the page 1 of the DRAM 311 (S404). It means that, in S204 in the flowchart in FIG. 9 of the first embodiment, the image data is stored in the page 0 of the DRAM 311. In the processing shown in the flowchart in FIG. 12, however, the page 1 is selected as a storage destination. By this processing, the dummy data overwrite processing is stopped in S303 in FIG. 10. Thus, it becomes possible to overwrite the data left in the page 1 of the DRAM 311, which is precedingly read, by the image data read by the CCD line sensor 126.

Similar to the flowchart in FIG. 9, the CPU 309 keeps conveying the original and starts reading the original by the CCD line sensor 126 (S405). Then, passing through the lead delivery rollers 111 and 112, the original 102 is conveyed to the second reading section (back surface reading section) (S406). Next, just before the original reaches the second reading section, the CPU 309 gives an instruction to the MEMC 310 to store the image data of the CIS line sensor 128 in the page 0 of the DRAM 311 (S407). This is because, in S404, the image data from the CCD line sensor 126 is stored in the page 1, so that it is necessary to select the page 0, not page 1, to store the image data of the CIS line sensor 128 therein in S407. Similar to the flowchart in FIG. 9, the CPU 309 keeps conveying the original and starts reading the original by the CIS line sensor 128 (S408). Then, the original is conveyed by the delivery roller 113. The original is then delivered to the delivery tray 114 (S409). Further, the CPU 309 determines the presence/absence of a transfer start request of the front surface image data from the host connected to the data output line 307 (S410). If it is determined that there is no transfer request, the CPU 309 again determines the presence/absence of the transfer request (S410: N). Unlike the processing in the flowchart in FIG. 9, the image data of the front surface of the original is stored in the page 1 of the DRAM 311. If it is determined that there is the transfer request (S410: Y), the CPU 309 controls the MEMC 310 to read the image data in the page 1 of the DRAM 311 to and transfer the data read to the data output line 307 (S411).

In S412 in the flowchart in FIG. 12, the CPU 309 determines whether reading and transferring of the image data in the page 1 from the MEMC 310 has been finished or not (S412). If a read and a transfer notification from the MEMC 310 is not received, the CPU 309 determines that the transfer is not finished (S412: Y). If the transfer notification is received, the CPU 309 determines that the transfer is finished (S412: Y). Thereafter, the CPU 309 determines whether the transfer start request of the back surface image data is notified from the host side (S413). If such a request is not notified, the CPU 309 repeats the determination processing again (S413: N). Unlike the processing in the flowchart in FIG. 9, the back surface image data is stored in the page 0 of the DRAM 311. Thus, if the transfer start request of the back surface image data is notified (S413: Y), the CPU 309 controls the MEMC 310 to read the image data in the page 0, in which the back surface image data is stored, to transfer the data read to the data output line 307 (S414). Thereafter, the CPU 309 waits for the read and transfer completion notification of the image data of the page 0 from the MEMC 310. Then, the CPU 309 determines whether the transfer of the image data in the page 0 of the DRAM has been completed or not (S415). Similar to the processing after S216 shown in the flowchart in FIG. 9, the CPU 309 determines whether there is the next original on the original tray 101 (S416 to S418).

Note that, in the embodiments 1 and 2, the DRAM is divided into two areas, page 0 and page 1, to write the image data therein. Not limited to this, the DRAM may be divided into more than three areas. In this case, when the instruction to start reading the image is received during the overwrite processing, the CPU 309 selects the page where the writing of the dummy data is not performed to write the image data from the selected page. Further, when the instruction to start reading the image is received in the middle of the overwrite processing in a state where the DRAM is not divided into one or more pages, writing of the newly read image data may be started from the area in the DRAM where the writing of the dummy data is not performed.

As mentioned, according to the present embodiment, data can be overwritten and erased as fast as possible, which is achieved by reducing the frequency of the refresh processing when the image data stored in the memory of the apparatus is overwritten and erased while suppressing the cost up of the image reading apparatus. Thus, leakage of secrets of the documents and the like having a high confidentiality can be prevented. Further, due to the reduction in waiting time of the apparatus, convenience of use of the apparatus is enhanced.

Further, according to the present embodiment, data holding processing, which is to perform processing intermittently required to hold the data stored in the image data storing unit, is performed. Then, after the image data is output, the frequency to execute the data holding processing is reduced. Thus, the time required for the processing needed to perform the data holding processing can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-080753, filed Apr. 10, 2014, which is hereby incorporated by reference wherein in its entirety.

What is claimed is:

1. An information processing apparatus, comprising: a processor and a memory;
   a storing unit configured to store image data;
   a writing unit configured to write image data in the storing unit;
   a reading unit configured to read the image data stored in the storing unit;
   a refresh processing unit configured to perform refresh processing at a predetermined frequency to hold the image data stored in the storing unit; and
   a control unit configured to control the writing unit to, after the image data is read from the storing unit, overwrite dummy data on the image data read from the storing unit and control a frequency of the refresh processing,
   wherein a first frequency of the refresh processing, when overwriting the dummy data on the image data read from the storing unit, is less than a second frequency of the refresh processing, when the image data read is stored in the storing unit,
   wherein the processor and the memory cooperate to function as the writing unit, the reading unit, the refresh processing unit and the control unit.

2. The information processing apparatus according to claim 1,
   wherein the control unit is further configured to control, when writing the image data in the storing unit, the frequency of the refresh processing to be the second frequency, and
   wherein the control unit is further configured to stop, when attempting to store the image data in the storing unit during writing of the dummy data, overwriting of the dummy data and to change the frequency of the refresh processing from the first frequency to the second frequency.

3. The information processing apparatus according to claim 1, wherein the storing unit includes a dynamic random access memory (DRAM).

4. The information processing apparatus according to claim 1, wherein
   the first frequency is zero (0); and
   the control unit is further configured to control the refresh processing unit so as not to perform the refresh processing when overwriting the dummy data.

5. An original reading apparatus, comprising:
   a processor and a memory;
   an original reading unit configured to read an original;
   a storing unit configured to store image data obtained by reading the original by the reading unit;
   a writing unit configured to write image data in the storing unit;
   a reading unit configured to read the image data stored in the storing unit;
   a refresh processing unit configured to perform refresh processing at a predetermined frequency to hold the image data stored in the storing unit; and
   a control unit configured to control the writing unit to, after the image data is read from the storing unit by the reading unit, overwrite dummy data on the image data read from the storing unit and control a frequency of the refresh processing,
   wherein a first frequency of the refresh processing, when overwriting the dummy data on the image data read from the storing unit, is less than a second frequency of the refresh processing when the image data read is stored in the storing unit,
   wherein the processor and the memory cooperate to function as the writing unit, the reading unit, the refresh processing unit and the control unit.

6. The original reading apparatus according to claim 5, wherein the control unit is further configured to perform, after the image data is read and when there is a next original to be read, reading of the next original instead of performing writing of the dummy data by the writing unit.

7. The original reading apparatus according to claim 5, wherein the control unit is further configured to:
   reduce the frequency of the refresh processing to be less than the second frequency, and maintain, in case where there is not any original to be read next, the frequency of the refresh processing to be less than the second frequency until another image data is stored in the storing unit.

8. The original reading apparatus according to claim 5, wherein the control unit is further configured to control the writing unit to write, among areas of the storing unit, the dummy data in an area which is identified to be an area in which image data obtained by reading the original is stored.

9. The original reading apparatus according to claim 5, wherein the storing unit includes a dynamic random access memory (DRAM).

10. The original reading apparatus according to claim 5, wherein the first frequency is zero (0); and
the control unit is further configured to control the refresh processing unit so as not to perform the refresh processing when overwriting the dummy data.

11. A control method of an information processing apparatus, the method comprising a processor executing the steps of:
storing image data in a storing unit;
writing image data in the storing unit;
reading the image data stored in the storing unit;
performing refresh processing at a predetermined frequency to hold the image data stored in the storing unit; and
controlling the writing to, after the image data is read from the storing unit, overwrite dummy data on the image data read from the storing unit and control a frequency of the refresh processing,
wherein a first frequency of the refresh processing, when overwriting the dummy data on the image data read from the storing unit, is less than a second frequency of the refresh processing, when the image data read is stored in the storing unit.

12. A control method of an original reading apparatus, the method comprising a processor executing the steps of:
reading an original by an original reading unit;
storing image data obtained by reading the original by the reading unit in a storing unit;
writing image data in the storing unit;
reading the image data stored in the storing unit by a reading unit;
performing refresh processing at a predetermined frequency to hold the image data stored in the storing unit; and
controlling the writing to, after the image data is read from the storing unit by the reading unit, overwrite dummy data on the image data read from the storing unit and control a frequency of the refresh processing,
wherein a first frequency of the refresh processing, when overwriting the dummy data on the image data read from the storing unit, is less than a second frequency of the refresh processing when the image data read is stored in the storing unit.

* * * * *